US005413730A

United States Patent [19]

Barthelemy et al.

[11] Patent Number: 5,413,730

[45] Date of Patent: May 9, 1995

[54] COMPOSITIONS CONTAINING A FLUORINATED ETHER AND USE OF THESE COMPOSITIONS

[75] Inventors: Pierre Barthelemy, Pietrebais; Mireille Paulus, Brussels, both of Belgium

[73] Assignee: Solvay (Société Anonyme), Brussels, Belgium

[21] Appl. No.: 156,917

[22] Filed: Nov. 24, 1993

[30] Foreign Application Priority Data

Dec. 3, 1992 [BE] Belgium ............................ 09201063

[51] Int. Cl.[6] ......................... C11D 7/30; C11D 7/50; C23G 5/032; C09K 3/00

[52] U.S. Cl. ...................................... 252/171; 134/12; 134/31; 134/38; 134/40; 252/170; 252/194; 252/364; 252/DIG. 9

[58] Field of Search ............... 252/162, 170, 171, 194, 252/364, DIG. 9; 134/12, 31, 38, 40, 42

[56] References Cited

U.S. PATENT DOCUMENTS

| | | | |
|---|---|---|---|
| 3,761,524 | 9/1973 | Terrell et al. | 260/614 F |
| 3,922,228 | 11/1975 | Hutchinson | 252/67 |
| 4,113,883 | 9/1978 | Bagnall | 424/342 |
| 5,023,010 | 6/1991 | Merchant | 252/171 |
| 5,087,383 | 2/1992 | Robeck et al. | 252/171 |
| 5,300,253 | 4/1994 | Buchwald et al. | 252/194 |
| 5,304,320 | 4/1994 | Barthelemy et al. | 252/67 |

FOREIGN PATENT DOCUMENTS

| | | |
|---|---|---|
| 0416777A2 | 3/1991 | European Pat. Off. . |
| 0450855A2 | 10/1991 | European Pat. Off. . |
| 0510295A2 | 10/1992 | European Pat. Off. . |
| 2232673 | 12/1990 | United Kingdom . |

*Primary Examiner*—Linda Skaling
*Attorney, Agent, or Firm*—Spencer, Frank & Schneider

[57] ABSTRACT

The invention relates to compositions containing difluoromethoxy-2,2,2-trifluoroethane and an alcohol. These compositions can be used especially as solvent for cleaning electronic components and for degreasing metals.

11 Claims, No Drawings

COMPOSITIONS CONTAINING A FLUORINATED ETHER AND USE OF THESE COMPOSITIONS

The invention relates to compositions containing a fluorinated ether in combination with an alcohol and to the uses of these compositions, especially as cleaning agent.

Completely halogenated chlorofluorocarbons (CFC), such as 1,1,2-trichloro-1,2,2-trifluoroethane (CFC-113), are widely used as solvents in industry for degreasing and cleaning various surfaces, particularly for objects of complex shape and which are difficult to clean. In addition to their use in electronics in the cleaning of printed circuit boards in order to remove the soldering flux which adheres to printed circuits, they are also conventionally used for degreasing metal objects or for cleaning high-quality and high-precision mechanical objects. In these various applications, CFC-113 is most often combined with other organic solvents, preferably in the form of azeotropic or pseudoazeotropic compositions which have essentially the same composition in the vapour phase and in the liquid phase and which can thus be easily used at reflux.

Compositions based on CFC-113 are also conventionally used as desiccating agent, in order to remove the water adsorbed at the surface of delicate objects.

However, CFC-113, like other completely halogenated chlorofluoroalkanes, is nowadays suspected of causing environmental problems, on the one hand, with respect to the destruction of the stratospheric ozone layer and, on the other hand, with respect to global warming (greenhouse effect).

The influence which a product may have on the ozone layer has been quantified using complex mathematical models and is expressed by its ozone destroying potential (ODP), relative to that of CFC-11. The influence of a product on the greenhouse effect is expressed, still relative to CFC-11, by its global warming potential (GWP).

Depending on the model chosen, the ODP for CFC-113 ranges from 0.8 to 0.9 and its GWP from 1.3 to 1.4. Consequently, there is currently an urgent need to find new solvent compositions which do not have an adverse influence on the ozone layer.

To this end, a number of azeotropic compositions based on fluorinated ethers have recently been proposed. For example, patent application Ser. No. EP-A-0,450,855 proposes using, in solvent cleaning operations, compositions containing fluorinated ethers of low-molecular weight and with a boiling point from about 20° to about 120° C. In this application, 1-methoxy-1,1,2-trifluoro-2-chloroethane/methanol, methoxytetrafluoroethane/methanol and ethoxytetrafluoroethane/methanol azeotropic mixtures are disclosed. U.S. Pat. No. 5,023,010 discloses azeotropic mixtures of 1,1,1,2,3,3-hexafluoro-3-methoxypropane with methanol, isopropanol or n-propanol.

One of the objectives of the present invention is to provide other compositions, optionally forming azeotropes or pseudoazeotropes, which are particularly effective when they are used as cleaning agent in solvent cleaning processes. The subject of the invention is also such compositions which possess properties particularly adapted to the cleaning of printed circuit boards. Another objective of the invention is to provide such compositions which have a zero ODP and a particularly low GWP, which compositions can then be used as replacement for solvents based on completely halogenated chlorofluoroalkanes.

The present invention relates to compositions containing difluoromethoxy-2,2,2-trifluoroethane and at least one alcohol. Preferably, the alcohol is a lower alcohol such as methanol, ethanol, propanol and isopropanol. In a particularly preferred manner, the alcohol is chosen from methanol, ethanol and isopropanol. In a manner which is most particularly preferred, the alcohol is methanol or ethanol.

The difluoromethoxy-2,2,2-trifluoroethane can be obtained by any means, especially by reaction between the trifluoroethanol and the chlorodifluoromethane as described in U.S. Pat. No. 3,761,524.

The difluoromethoxy-2,2,2-trifluoroethane and alcohol contents in the compositions according to the invention, can vary within wide limits depending on the use envisaged.

Generally, the compositions according to the invention contain at least 75% by weight of difluoromethoxy-2,2,2-trifluoroethane. They advantageously contain at least 85% by weight thereof. In a particularly preferred manner, they contain at least 90% thereof. They may contain up to 99.995% by weight thereof. Most often, they contain at most 99.9% by weight, preferably at most 99.5% by weight thereof.

The compositions according to the invention contain 0.005 to 25% by weight of alcohol. Preferably, they contain 0.02 to 15% thereof. In a particularly preferred manner, they contain 0.2 to 10% thereof.

Various additives may be optionally present in the compositions according to the invention. The compositions according to the invention may thus contain stabilizers, surfactants or any other additives which make it possible to improve the performance of the compositions according to the invention during their use. The nature and quantity of these additives are a function of the use envisaged and are easily defined by a person skilled in the art. Generally, the quantity of additives present in the compositions according to the invention does not exceed about 25% of the weight of the composition, most often not more than 10%.

In the compositions according to the invention, difluoromethoxy-2,2,2-trifluoroethane and the alcohol have the characteristic of forming azeotropic mixtures for well defined compositions. Preferred compositions according to the invention are therefore those which contain the difluoromethoxy-2,2,2-trifluoroethane and the alcohol in proportions in which they form an azeotrope or a pseudoazeotrope. Such compositions are especially obtained when the alcohol is methanol or ethanol. The compositions containing difluoromethoxy-2,2,2-trifluoroethane and methanol in proportions in which they form an azeotrope or a pseudoazeotrope are particularly preferred.

Basically, the thermodynamic state of a fluid is defined by four interdependent variables: the pressure (P), the temperature (T), the composition of the liquid phase (X) and the composition of the gaseous phase (Y). An azeotrope is a specific system with 2 or more components for which at a given temperature and at a given pressure, X is exactly equal to Y. A pseudoazeotrope is a system with 2 or more components for which, at a given temperature and at a given pressure, X is essentially equal to Y. In practice, this means that the constituents of such azeotropic and pseudoazeotropic systems cannot be easily separated by distillation and therefore their composition remains constant during the solvent cleaning operations as well as during operations for recovering used solvents by distillation.

For the purpose of the present invention, pseudoazeotrope is understood to mean a mixture of two or more constituents whose boiling point (at a given pressure) differs from the boiling point of the azeotrope by 0.5° C. maximum.

The compositions according to the invention are characterized by their compositions observed at a given pressure. It goes without saying that the compositions according to the invention are not thereby limited to these specific compositions. It is indeed well known that the composition and boiling point of an azeotrope with 2 or more constituents varies according to the pressure conditions chosen.

The difluoromethoxy-2,2,2-trifluoroethane and the methanol form an azeotrope or a pseudoazeotrope when their mixture contains 0.1 to 7.5 g of methanol per 100 g of difluoromethoxy-2,2,2-trifluoroethane. In particular, they form an azeotrope or a pseudoazeotrope when their mixture contains 1 to 5 g of methanol per 100 g of difluoromethoxy-2,2,2-trifluoroethane. At atmospheric pressure, the binary composition essentially consisting of about 97% by weight of difluoromethoxy-2,2,2-trifluoroethane and about 3% by weight of methanol, constitutes an azeotrope whose boiling point is about 29.3° C. This composition is most particularly preferred.

The difluoromethoxy-2,2,2-trifluoroethane and the ethanol form an azeotrope or a pseudoazeotrope when their mixture contains 0.01 to 3 g of ethanol per 100 g of difluoromethoxy-2,2,2-trifluoroethane. In particular, they form an azeotrope or a pseudoazeotrope when their mixture contains 0.03 to 1 g of ethanol per 100 g of difluoromethoxy-2,2,2-trifluoroethane. At a pressure of 4 bar, the binary composition essentially consisting of about 99.7% by weight of difluoromethoxy-2,2,2-trifluoroethane and about 0.3% by weight of ethanol, constitutes an azeotrope whose boiling point is about 74.9° C. This composition is most particularly preferred.

The compositions according to the invention have a boiling point sufficient to replace CFC-113-based compositions in existing cleaning appliances. As regards its environmental impact, difluoromethoxy-2,2,2-trifluoroethane appears to be particularly advantageous since it has a zero ozone destroying potential. The compositions according to the invention are furthermore inert towards various types of surfaces to be treated, whether they are made from metal, plastic or glass.

The compositions according to the invention can therefore be used in the same applications and according to the same techniques as previous compositions based on CFC-113. In particular, the compositions according to the invention can be used as cleaning agent, solvent, degreasing agent, flux-removing agent or desiccant. Compositions which are particularly suitable in these various applications are those where the constituents are present in proportions in which they form an azeotrope or pseudoazeotrope.

The non-restrictive examples below illustrate the invention in greater detail.

EXAMPLE 1

In order to demonstrate the existence of azeotropic or pseudoazeotropic compositions between difluoromethoxy-2,2,2-trifluoroethane and methanol, a glass apparatus consisting of a boiler flask surmounted by a reflux condenser was used. The temperature of the liquid is measured by means of a thermometer immersed in the flask.

25 ml of pure difluoromethoxy-2,2,2-trifluoroethane have been heated at atmospheric pressure until boiling occurs, then small quantities of methanol have been gradually introduced into the flask by means of a graduated syringe, via a side neck equipped with a septum.

The determination of the azeotropic composition has been performed by recording the variation of the boiling temperature of the mixture as a function of its composition. The composition for which a minimum or maximum boiling point has been observed is the azeotropic composition at atmospheric pressure.

The influence of atmospheric pressure on the boiling temperature of the mixtures has been corrected by means of the following formula:

$$tc = tr + 0.00012\,(760 - P)\,(273 + tr)$$

with tr, the temperature recorded in °C.

tc, the corrected temperature in °C.

P, the atmospheric pressure at the time of the measurement, in mmHg..

The corrected boiling temperatures obtained for various difluoromethoxy-2,2,2-trifluoroethane and methanol compositions are presented in Table I.

The best estimation of the composition for which the boiling point is minimum is about 97% by weight of difluoromethoxy-2,2,2-trifluoroethane. The boiling point is 29.5° C.±0.2° C. for compositions containing about 93 to 99.9% by weight of difluoromethoxy-2,2,2-trifluoroethane.

TABLE I

| Methanol added, ml | Percentage $CF_3—CH_2—O—CHF_2$ by volume | by weight | by mol | Corrected temperature (°C.) |
|---|---|---|---|---|
| 0 | 100.00 | 100.00 | 100.00 | 29.8 |
| 0.5 | 98.04 | 98.88 | 94.77 | 29.4 |
| 1.0 | 96.15 | 97.78 | 90.06 | 29.3 |
| 1.5 | 94.34 | 96.71 | 85.81 | 29.3 |
| 2.0 | 92.59 | 95.66 | 81.93 | 29.3 |
| 2.5 | 90.91 | 94.64 | 78.40 | 29.5 |
| 3.0 | 89.29 | 93.64 | 75.16 | 29.6 |
| 3.5 | 87.72 | 92.65 | 72.16 | 29.8 |
| 4.0 | 86.21 | 91.69 | 69.40 | 30.0 |
| 5.0 | 83.33 | 89.83 | 64.47 | 30.3 |

EXAMPLE 2

This example demonstrates the pseudoazeotrope consisting of difluoromethoxy-2,2,2-trifluoroethane and ethanol.

A solution containing 99.87% by weight of difluoromethoxy-2,2,2-trifluoroethane and 0.13% by weight of ethanol is prepared by mixing the two constituents. This solution was subjected to distillation, at atmospheric pressure, by means of a vigreux column. Various fractions of the distillate, each representing about 12 to 15% of the volume of the initial solution, were collected by means of a multi-limb receiver and then analysed by gas chromatography.

The results obtained are presented in Table II.

TABLE II

| Distillate fraction | Ethanol content (g/kg) |
|---|---|
| 1 | 0.60 |

TABLE II-continued

| Distillate fraction | Ethanol content (g/kg) |
|---|---|
| 2 | 0.46 |
| 3 | 0.51 |
| 4 | 0.51 |

Analysis of the results indicate that only small differences exist between the compositions of the various distillate fractions collected as the distillation progresses.

We claim:

1. An azeotropic or pseudoazeotropic composition consisting essentially of a binary mixture of difluoromethoxy-2,2,2-trifluoroethane and methanol, said composition consisting essentially of 0.1 to 7.5 g of methanol per 100 g of difluoromethoxy-2,2,2-trifluoroethane, and having a boiling point of 29.5°±0.2° C. at atmospheric pressure.

2. The azeotropic or pseudoazetropic composition according to claim 1, consisting essentially of from 1 to 5 g of methanol per 100 g of difluoromethoxy-2,2,2-trifluoroethane.

3. The azeotropic composition according to claim 1, consisting essentially of about 3% by weight of methanol and about 97% by weight of difluoromethoxy-2,2,2-trifluoroethane, said composition having a boiling point of about 29.3° C. at atmospheric pressure.

4. In a cleaning agent, the improvement comprising an azeotropic or pseudoazeotropic composition consisting essentially of a binary mixture of difluoromethoxy-2,2,2-trifluoroethane and methanol, said composition consisting essentially of 0.1 to 7.5 g of methanol per 100 g of difluoromethoxy-2,2,2-trifluoroethane, and having a boiling point of 29.5°±0.2° C. at atmospheric pressure.

5. In a degreasing agent for solid surfaces, the improvement comprising an azeotropic or pseudoazeotropic composition consisting essentially of a binary mixture of difluoromethoxy-2,2,2-trifluoroethane and methanol, said composition consisting essentially of 0.1 to 7.5 g of methanol per 100 g of difluoromethoxy-2,2,2-trifluoroethane, and having a boiling point of 29.5°±0.2° C. at atmospheric pressure.

6. In a cleaning agent for printed circuit boards contaminated with soldering flux and flux residues, the improvement comprising an azeotropic or pseudoazeotropic composition consisting essentially of a binary mixture of difluoromethoxy-2,2,2-trifluoroethane and methanol, said composition consisting essentially of 0.1 to 7.5 g of methanol per 100 of difluoromethoxy-2,2,2-trifluoroethane, and having a boiling point of 29.5°±0.2° C. at atmospheric pressure.

7. In a desiccating agent for removing water adsorbed at the surface of solid objects, the improvement comprising an azeotropic or pseudoazeotropic composition consisting essentially of a binary mixture of difluoroethoxy-2,2,2-trifluoroethane and methanol, said composition consisting essentially of 0.1 to 7.5 g of methanol per 100 g of difluoromethoxy-2,2,2-trifluoroethane, and having a boiling point Of 29.5°±0.2° C. at atmospheric pressure.

8. The cleaning agent according to claim 4, consisting of a binary mixture of difluoromethoxy-2,2,2-trifluoroethane and methanol.

9. The degreasing agent according to claim 5, consisting of a binary mixture of difluoromethoxy-2,2,2-trifluoroethane and methanol.

10. The cleaning agent for printed circuit boards according to claim 6, consisting of a binary mixture of difluoromethoxy-2,2,2-trifluoroethane and methanol.

11. The desiccating agent as set forth in claim 7, consisting of a binary mixture of difluoromethoxy-2,2,2-trifluoroethane and methanol.

* * * * *